Nov. 8, 1938. L. A. MAJNERI 2,136,194

BRAKE MECHANISM

Filed Jan. 8, 1936 3 Sheets-Sheet 1

INVENTOR
LUDWIG A. MAJNERI.
BY
ATTORNEY

Nov. 8, 1938.　　　L. A. MAJNERI　　　2,136,194
BRAKE MECHANISM
Filed Jan. 8, 1936　　　3 Sheets-Sheet 2

INVENTOR
LUDWIG A. MAJNERI.
BY
ATTORNEY

Nov. 8, 1938.    L. A. MAJNERI    2,136,194
BRAKE MECHANISM
Filed Jan. 8, 1936    3 Sheets-Sheet 3
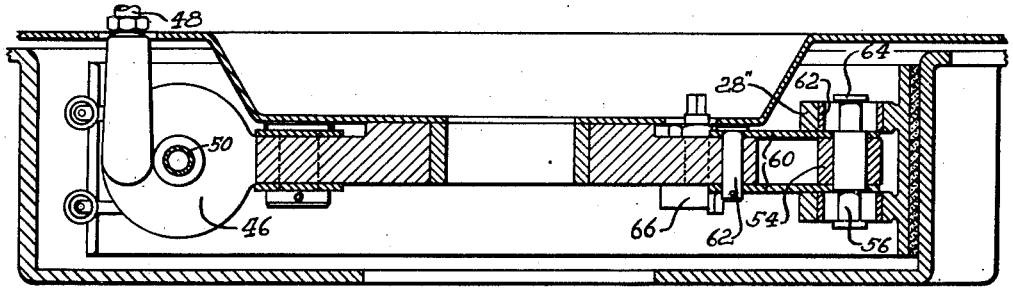
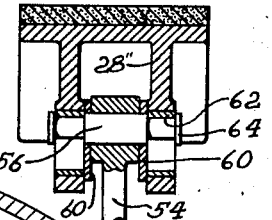
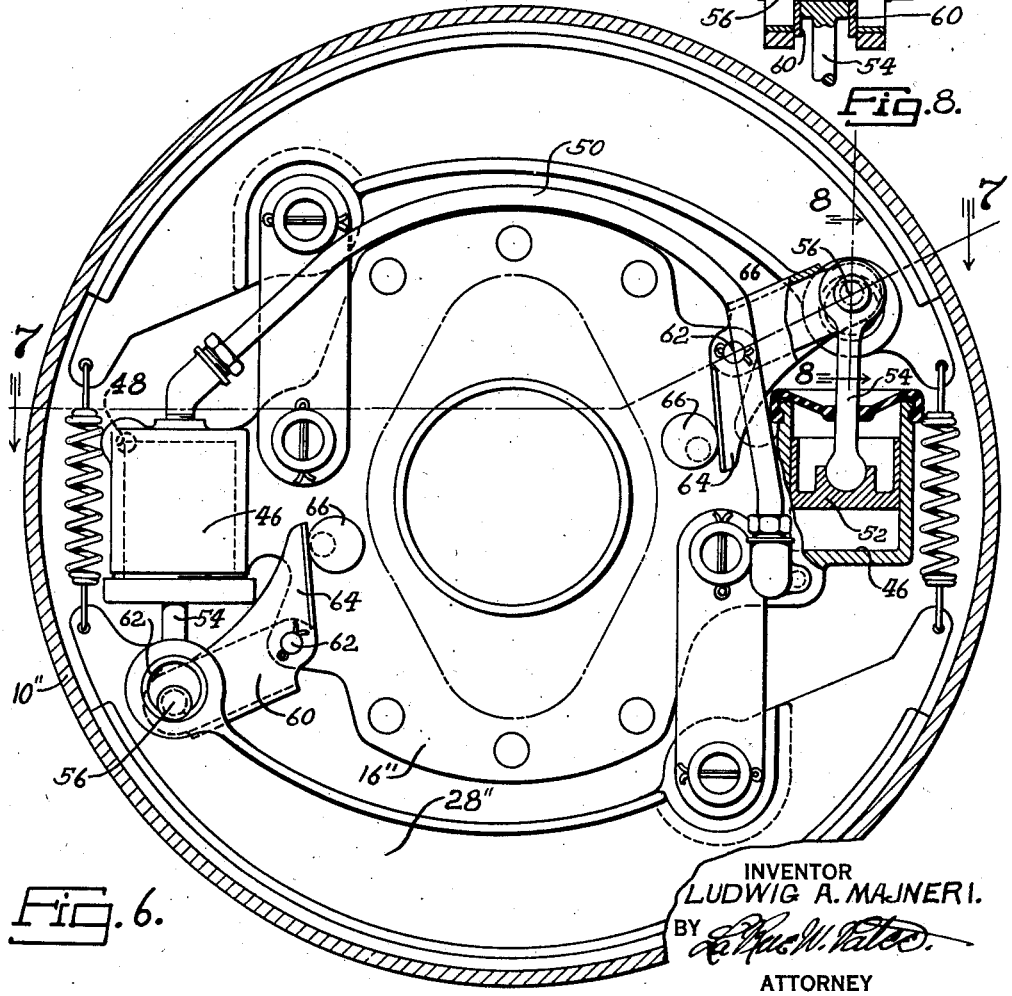
INVENTOR
LUDWIG A. MAJNERI.
BY
ATTORNEY Patented Nov. 8, 1938

2,136,194

UNITED STATES PATENT OFFICE 2,136,194

BRAKE MECHANISM

Ludwig A. Majneri, Grosse Pointe, Mich.

Application January 8, 1936, Serial No. 58,038

2 Claims. (Cl. 188—78)

This invention relates to brake mechanism and is illustrated as embodied in a brake mechanism for wheels such as used on automobiles or airplanes.

An object of the invention is to provide a brake mechanism of the internal shoe type which is to some extent self-energizing.

Another object of the invention is to provide a brake mechanism in which the shoes are actuated by application of force at the toes of the shoes through a centrally located and centrally pivoted actuating lever.

Another object of the invention is to provide an arrangement of links for supporting the brake shoes which results in the reduction and control of the brake applying effort and eliminates to a great extent the necessity for external booster or servo mechanism.

A still further object of the invention is to provide a locating means for the shoes in their retracted position and to provide retaining means for the actuating lever.

Other objects and advantages of the invention will be more apparent from the following description taken in connection with the accompanying drawings, in which:

Fig. 6 is a side view, partly in section, showing a further modification of the invention wherein a hydraulic solution is used for applying the force to the brake shoes.

Fig. 7 is a sectional view taken on line 7—7 of Fig. 6.

Fig. 8 is a fragmentary sectional view taken on line 8—8 of Fig. 6.

Figure 1:
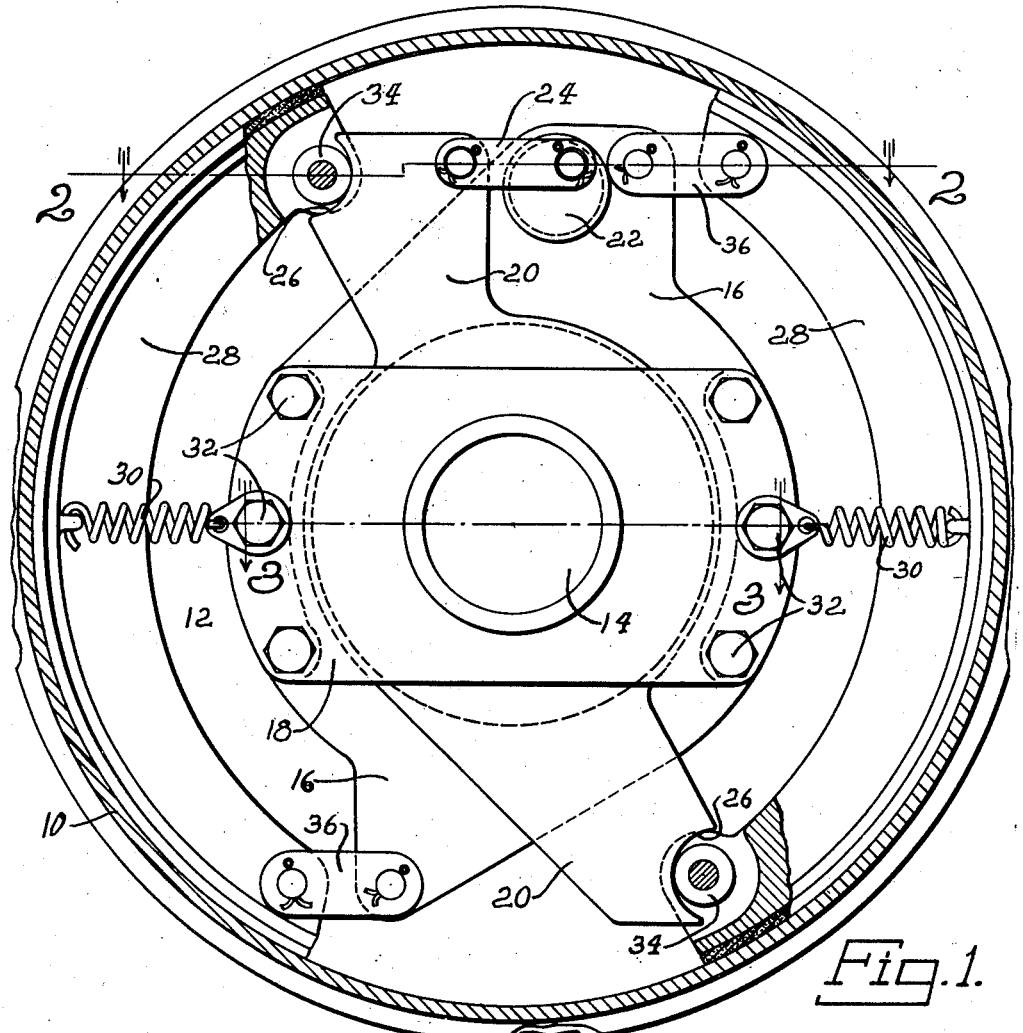
Fig. 1 is a side view, partly in section, showing a preferred embodiment of the invention.
Figure 2:
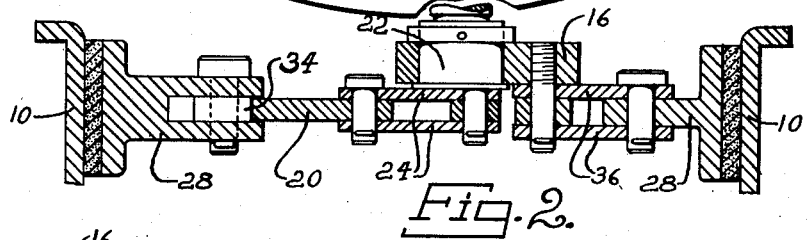
Fig. 2 is a sectional view taken on line 2—2 of Fig. 1.
Figure 3:
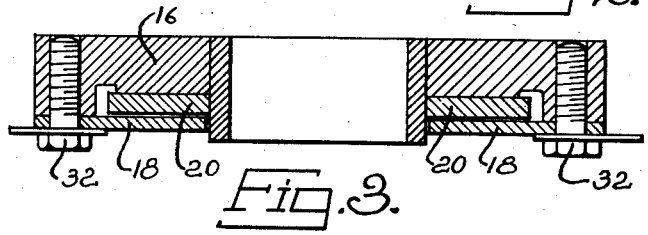
Fig. 3 is a sectional view taken on line 3—3 of Fig. 1.

Referring to the drawings and particularly to Fig. 1, a wheel drum is shown at 10, the back plate of which is not shown. An anchor plate 12 is secured to a stationary axle 14. The plate 12 serves as a supporting plate for the brake mechanism and as a closure for the open face of the brake drum. A member 16 is secured to the plate 12 and spaced therefrom is another plate 18.

Between the plates 16 and 18 I have pivotally mounted an operating lever 20 which at its upper end is operated by a cam 22 connected to the lever 20 by a link 24. The cam 22 is connected to the wheel brake operating mechanism, not shown. The opposite ends of the lever 20 are provided with recesses 26.

The brake shoes are shown at 28, being urged inwardly by springs 30 connected to the shoes and to bolts 32 which secure the plates 16 and 18 to the plate 12. One end of one shoe is provided with a roller 34 which engages in one of the recesses 26 on the lever 20. If desired the roller 34 may be non-rotatably mounted, and has an outer periphery of less diameter than the periphery of the recess 26. It will be noted that the rollers 34 on the ends of the shoes are located at diametrically opposite points and serve as the positioning means for the shoes. The opposite ends of the shoes are connected to the plate 16 by links 36 which are pivotally secured to the shoes 28 and to the plate 16 and serving as the anchorage for the shoes. By this arrangement the shoes 28 are self-centering and are urged to their normal inoperative position by the springs 30.

Figure 4:
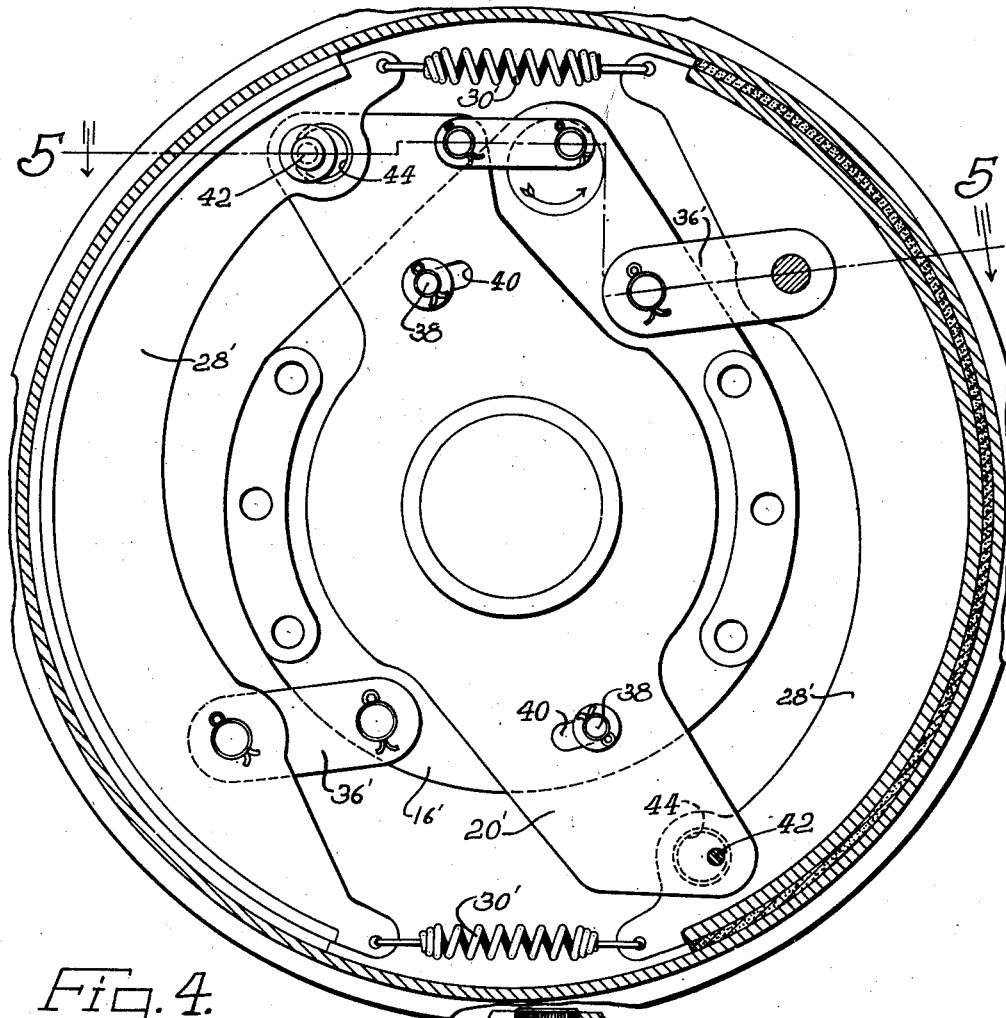
Fig. 4 is a side view, partly in section, showing a modified form of the invention.
Figure 5:
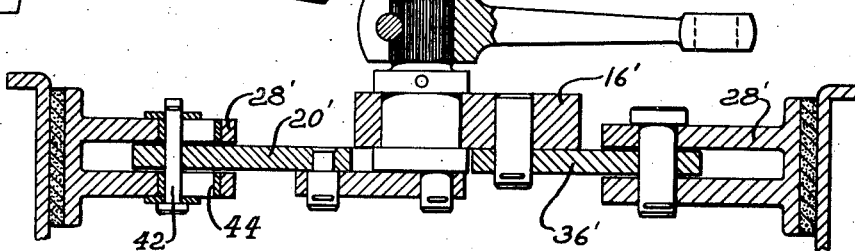
Fig. 5 is a sectional view taken on line 5—5 of Fig. 4.

In the modified form of the invention illustrated in Fig. 4, I have shown the operating lever 20' secured to the plate 16' by a pin 38 and slot 40 connection. The slot 40 is circumferentially formed in the lever 20' and the pin 38 is carried by the plate 16'. This connection permits angular movement of the lever 20' and retains it against axial movement. In this form of the device, a pin 42 is carried at the opposite ends of the lever 20' and engages a comparatively large opening 44 in the flange of the brake shoe 28'. It will be noted that this is a reversal of the construction shown and described in the embodiment in Fig. 1. In this form of my device the springs 30' are provided between the adjacent ends of the shoes to urge them into inoperative position. It will also be noted that the links 36' which secure the shoes to the plate 16' are positioned between the central portion of the shoe and the opposite end thereof. It will be noted that the link 36' is either inclined as shown in Fig. 4 with the attaching point of the link to the shoe being further removed from the horizontal centerline than the attaching point of the link to the backing plate or the links may be installed parallel with the horizontal centerline as shown in Fig. 6, but at no time are the links located so that the attaching points to the shoes are closer to the horizontal centerline than the attaching points to the backing plate. The positioning of the links as described above is an important feature of the invention. With this arrangement the designer can reduce and control the effort required to operate the brake mechanism within the limitation of the available friction between the brake lining and the brake drum by calculating the proper location of the link. The reduction and control of the brake applying effort offered by this feature eliminates to a great extent the necessity of external booster or servo mechanism. It is to be understood that it requires less effort to apply the brakes as shown in Figs. 4 and 6 than it does in the showing in Fig. 1 due to the location of the link close to the center.

In the form of the invention illustrated in Figs. 6, 7 and 8, in place of levers 20 and 20' I have shown hydraulic cylinders 46 which expand the shoes radially. Fluid is supplied to the cylinders through a connection 48 connected to one of the cylinders 46 and the cylinders are interconnected by a conduit 50. A piston 52 is positioned in the cylinder 46 and actuates a rod 54 one end of which is connected to a pin 56 which engages an opening 58 larger in diameter than the diameter of the pin 56, this latter mechanism being positioned at one end of one of the shoes. A lever 60 is pivotally mounted on the pin 56 at one end and adjacent its center it is pivotally mounted on a pin 62 carried by the plate 16". The lever 60 has an extension 64 which engages a cam 66. By moving the cam 66 angular movement of the lever 60 may be had thereby moving the shoe 28" toward or away from the brake drum 10".

Referring to Fig. 7, I have provided a safety lock for the connection between the rod 54 and flange of the brake shoe 28". The pin 56 has a sliding fit in the rod 54 and the arm 60 is formed U-shaped having a pair of legs which engage the opposite ends of the rod 54. Bushings 62 are pressed into openings in the flanges of the shoe 28". The opposite ends of the pin 56 are provided with shoulders 64 which, as shown in Fig. 8, contact with the outer face of the respective bushings 62 thereby preventing axial movement of the bushings 62 relative to the pin 56. If the bushings should become loose they are held in position by the pin 56 which is held against axial movement by engagement of the bushing 62 on the outer surface of the arms of extensions of the link 60.

In the operation of applicant's device as shown in Fig. 1, the cam 22 is rotated in a counterclockwise direction, which, through the link 24, causes angular movement of the lever 20 about the axle 14, between the plates 16 and 18. The ends of the lever 20 are provided with recesses 26 which engage the rollers 34 on the shoes. This angular movement causes the shoes to move radially outward and slightly angular into frictional engagement with the drum. The slightly angular movement is permitted by the link 36, which, when moved in a counterclockwise direction, also urges the end of the shoe radially into further frictional engagement with the drum.

The operation of the device shown in Fig. 4 is substantially the same as that shown in Fig. 1 except that in place of the recesses 26 being carried by the lever 20, the lever 22' carries a pin which correspondingly engages the opening 44 in the shoe. This connection, both in Figs. 1 and 4, provides a means for centering the shoes on the lever 20.

In the operation of the device shown in Fig. 6 hydraulic pressure is applied to the cylinders 46 through a tube 48. This pressure moves the piston rods 54, forcing the ends of the shoes radially and slightly downwardly, pivoting the latter through the lever 60. The opposite ends of the shoes are carried by swinging links secured to the backing plate 16".

What I claim is:

1. In a brake mechanism, the combination of a rotatable drum, a supporting plate, oppositely disposed brake shoes within said drum, an operating lever pivoted on the axis of said rotatable drum, a connection at the opposite ends of said lever, one to the end of one shoe and the other to the opposite end of the other shoe, said connection comprising a pin contacting a concave surface of greater curvature than the periphery of said pin, links connecting each shoe to said supporting plate, and resilient tension means for urging said shoes radially inwardly.

2. In a brake mechanism, the combination of a rotatable drum, a supporting plate having a hub, a lever pivoted on said hub having oppositely extending arms each provided at its extremity with a concave recess, a pair of brake shoes within said drum, swinging links connecting said shoes to said supporting plate, said links being arranged diametrically opposite, pins carried by said shoes for engagement with the concave recesses of said lever, said pins being diametrically arranged, a tension spring arranged between each shoe at its central point and said supporting plate, and means for angularly moving said lever.

LUDWIG A. MAJNERI.